E. STANWOOD, Jr.
DEVICE FOR MEASURING DANGER ANGLE IN NAVIGATION.
APPLICATION FILED DEC. 18, 1919.
1,433,667.
Patented Oct. 31, 1922.
2 SHEETS—SHEET 2.
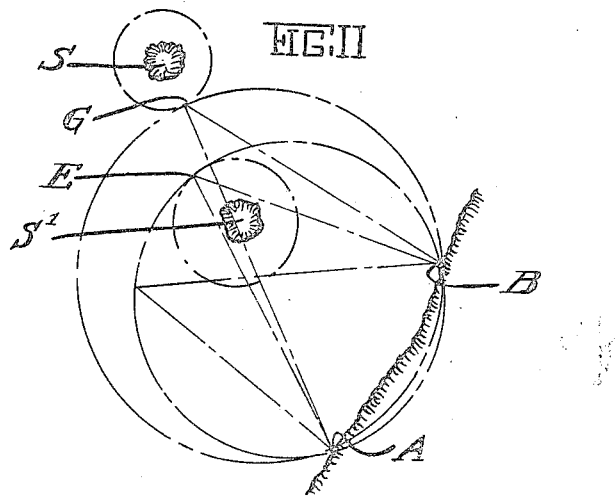
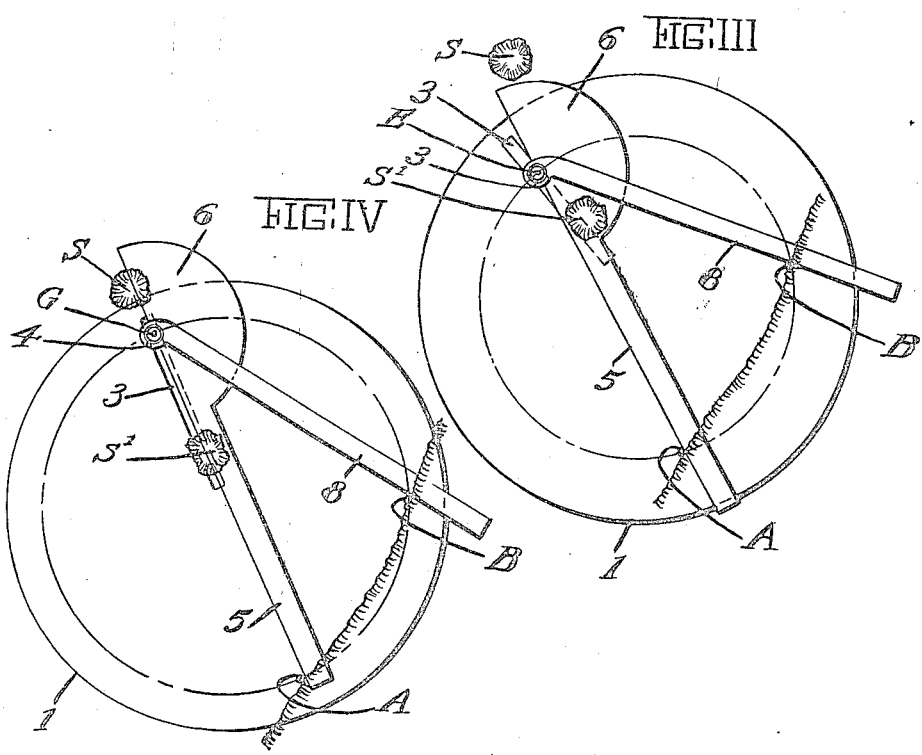
Inventor
Edward Stanwood Jr.
By Otis Spear
Attorney Patented Oct. 31, 1922.

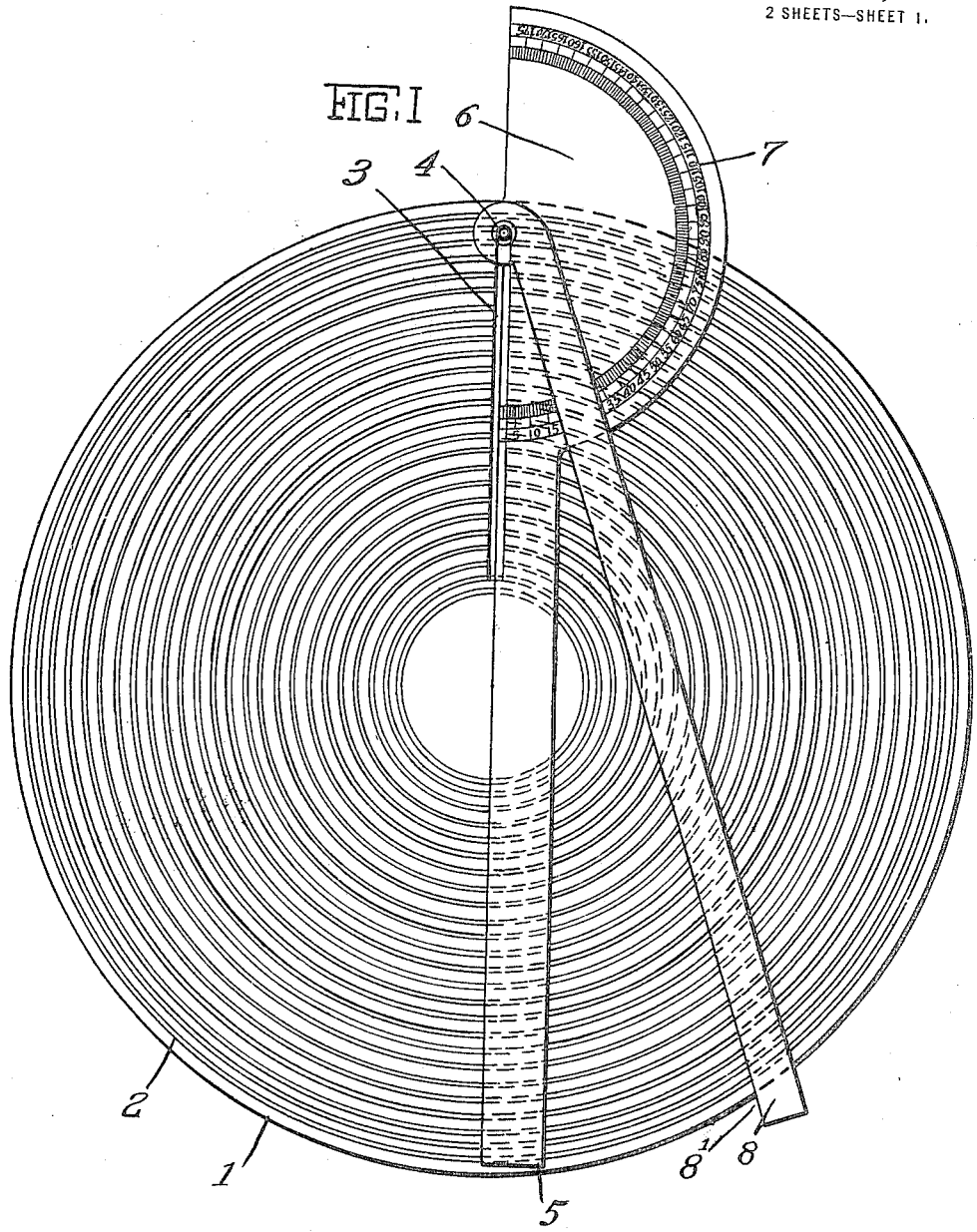

1,433,667

UNITED STATES PATENT OFFICE.

EDWARD STANWOOD, JR., OF WELLESLEY, MASSACHUSETTS.

DEVICE FOR MEASURING DANGER ANGLE IN NAVIGATION.

Application filed December 18, 1919. Serial No. 345,753.

*To all whom it may concern:*

Be it known that I, EDWARD STANWOOD, Jr., a citizen of the United States, residing at Wellesley, county of Norfolk, Commonwealth of Massachusetts, have invented certain new and useful Improvements in Devices for Measuring Danger Angle in Navigation, of which the following is a specification.

This invention relates to a device for quickly determining the so-called danger angle in coast navigation.

As far as I am aware no such device has ever been heretofore provided. This angle has usually been actually drawn in with dividers on the chart itself, and then measured with the protractors. This operation necessitates the drawing of a circle through three points and the consequent difficulty of finding the center. It furthermore is an operation which frequently must be performed under circumstances where accuracy is difficult on account of storm and other causes and where haste is required. All these factors have tended to make the use of the danger angle infrequent and little used, with the result that navigators have preferred to use cross bearings and the three-arm protractor and other methods. These are in themselves good enough, but troublesome and complicated, although not as inconvenient as the former method of determining the angle of danger.

As illustrative of my invention, I have shown a simple form of device which I have found well adapted to practical navigation and one so simple, convenient and inexpensive as to place it within the reach of all whether professional navigators, yachtsmen or students. While I shall discuss my invention with particular reference to the form shown, I am not to be understood as limiting myself in any way in regard to details of structure or manner of use. Throughout the specification and drawings like reference characters are used to indicate corresponding parts, and in the drawings:

Fig. I is a plan view of my instrument.

Fig. II an illustrative diagram showing old method of drawing in, and

Figs. III and IV illustrations of use of my instrument for the same problem.

Before explaining the use of the device above described, it may be convenient to first note the original manner of determining the angle of danger. Heretofore it has been customary in coast navigation upon approach of dangerous shoals or the like, to mark on the chart two shore points A and B clearly visible and which will remain visible and clearly shown and correctly located on the chart. (See Fig. II.)

It will be noted that the degree of separation of such points as A and B may vary widely under different circumstances. In addition to the shore points the navigator was obliged to establish a third point such as E off shore and beyond factors of danger S which he is seeking to avoid. This point must lie in a circle sufficiently large to include all factors of danger. In fact, it has always been deemed necessary to actually inscribe this circle through these three points in order that the margin of safety may be visually clear on the chart.

The three points having been selected and the circle drawn the navigator had next to draw the two chords connecting the off shore point in the circumference of his inscribed circle with the two shore points lying in said circle. The included angle between these two chords thus inscribed was then measured and the reading of this angle gave the so-called angle of danger. By constantly taking sextant readings on the two shore points the navigator was able to maintain a safe course with positive assurance as long as the sextant reading was not greater than the angle of danger thus obtained.

This practice and the supplementary usages for determining zones of safety between outlying rocks or shoals is set forth in books of navigation, notably in Bowditch, page 64 to which reference may be made for further illustration of this method. In Fig. II, I have indicated this second point as G off a shoal $S^1$ and drawn in the inclusive circle and chords.

In the form of the instrument shown I provide a transparent disc 1 preferably of celluloid or like material. This is inscribed with a series of concentric bands 2 preferably etched or colored to differentiate one from another and to aid in picking up the same circle in any part of the disc. On one side the disc is radially slotted as at 3 and through this slot is riveted a pair of arm members. The rivet 4 is preferably tubular so that it may be located exactly on center over a pencil dot on the map. The two members so riveted comprise an arm 5 carrying on its upper end a semi-circular enlargement 6 on which is a scale 7 concentric with the center of the rivet 4. The scale 7 is graduated in suitable degrees of arc and is read from the adjacent edge $8^1$ of the other pivoted member 8. The members 5 and 8 constitute straight edge chord arms for laying off the angle between the two shore points.

In the practice of my invention and in the use of the instrument herein shown as an illustrative embodiment, it is only necessary for the navigator to apply the transparent disc 1 to the face of the chart in the area in question. By the quick shifting of the concentric circles 2 over the face of the chart he can immediately select that circle which includes all of the danger area, making that circle pass through the two shore points A and B. He can then locate on the selected circle any point such as E which in his judgement is most characteristic of the danger of the particular place he is approaching. This point he covers by the apex rivet 4 of his protractor arms, sliding the free ends of said arms 5 and 8 to intersect the opposite side of the circle at the shore points. The danger angle is then immediately and directly apparent from the protractor scale 7. This is all that is required. The chart is not defaced. No lines are drawn and the whole result accomplished in a small fraction of the time previously required. Furthermore, where a second reading is required for a channel observation or for other places where the course must be held between two adjacent areas of danger, my device may be slightly moved to bring a larger circle through the new third or off shore point G and the second angle established and read. The navigator is then safe to proceed, having only to watch the two shore points A and B and make sure that the sextant reading lies between his two danger angles.

The importance of being able to determine not only one, but as many danger angles as may be required without difficulty and under the most adverse conditions can not be over estimated. Wherever conditions have prevented the ready determination of such angles or where they have been neglected by navigators on account of the inconvenience and difficulty, unnecessary risks have been incurred with the all too frequent result of the loss of vessels and the consequent loss of lives.

What I therefore claim and desire to secure by Letters Patent is:

1. An instrument for determining a danger angle in navigation, comprising a member having a pivot and an area of reference in circles of different radii, a pair of arms mounted on said pivot and movable radially of said member and having edges disposable in variable positions of chord across said area of reference, and a scale concentric with the pivot of said arms and in referable relation thereto.

2. An instrument for determining a danger angle in navigation, comprising a transparent member having a pivot and a plurality of concentric circular markings, a pair of arms mounted on said pivot and movable radially of said member and having edges disposable in variable positions of chord across said circular markings, and a scale concentric with the pivot of said arms and in referable relation thereto.

3. An instrument for determining a danger angle in navigation, comprising a transparent member having a pivot and a plurality of differentiated concentric circular markings, a pair of arms mounted on said pivot and movable radially of said member and having edges disposable in variable positions of chord across said circular markings, and a scale concentric with the pivot of said arms and in referable relation thereto.

4. In a device of the class described, a disc having a pivot and a series of concentric circles, and a pair of arms mounted on said pivot and radially adjustable relative to the center of said disc for determining the included angle of arc between two points on the periphery of any circle.

5. In a device of the class described, a disc having a pivot and a series of concentric circles, and a pair of arms mounted on said pivot and radially adjustable relative to the center of said disc for determining the included angle of arc between two points on the periphery of any circle.

6. In a device of the class described, a disc having a series of concentric circles, a pair of pivoted arms radially adjustable relative to the center of said disc for determining the included angle of arc between two points on the periphery of any circle, and a scale in referable relation to said arms and concentric with the pivot therefor.

7. In a device of the class described, a disc having a series of concentric circles and having a radial slot, a pivot adjustable in said slot, and a pair of arms mounted on said pivot for determining the included angle of arc between two points on the periphery of any circle.

8. In a device of the class described, a disc having a series of concentric circles and having a radial slot, a pivot adjustable in said slot, a pair of arms mounted on said pivot for determining the included angle of arc between two points on the periphery of any circle, and a scale in referable relation to said arms and concentric with the pivot therefor.

9. In a device of the class described, a disc having a series of concentric circles, a pair of arms pivoted on said disc for determining the included angle or arc between two points on the periphery of any circle, one of said arms extended as a scale, and said scale concentric with the pivot for the arms.

10. In a device of the class described, a disc having a series of concentric circles and having a radial slot, a pivot adjustable in said slot, an arm mounted on said pivot and having a radially disposed portion and a circular portion, said circular portion concentric with said pivot and having scale markings, and a second arm cooperative with said first-named arm.

11. In an instrument of the class described, a disc having a plurality of concentric circles, an arm pivotally and slidably mounted on said disc and having an offset portion provided with scale markings, and a second arm mounted on the pivot for the first-name arm and readable with relation to the scale markings of said offset portion.

12. In an instrument of the class described, a disc having concentric circles, an arm pivotally mounted on said disc for movement radially of said circles and having an arcually curved portion provided with scale markings and a second arm mounted on the pivot for the said first named arm and readable with relation to the scale markings of said arcually curved portion.

13. In an instrument of the class described, a disc having concentric circles, an arm pivoted to said disc and movable radially of said circles an having a scale portion disposed concentric to the pivot for said arm, and a second arm mounted on said pivot and readable with relation to said concentric scale portion.

14. In an instrument of the class described, a disc having a plurality of concentric circles, an arm pivotally and slidably mounted on said disc and having an offset portion provided with scale markings, and a second arm mounted on the pivot for said first-named arm and readable with relation to the scale markings of said offset portion.

In testimony whereof I affix my signature.

EDWARD STANWOOD, Jr.